July 20, 1965  S. GOLDFEIN  3,196,197
PROCESS FOR SHIPPING RIGID POLYURETHANE FOAM
Filed Nov. 1, 1962
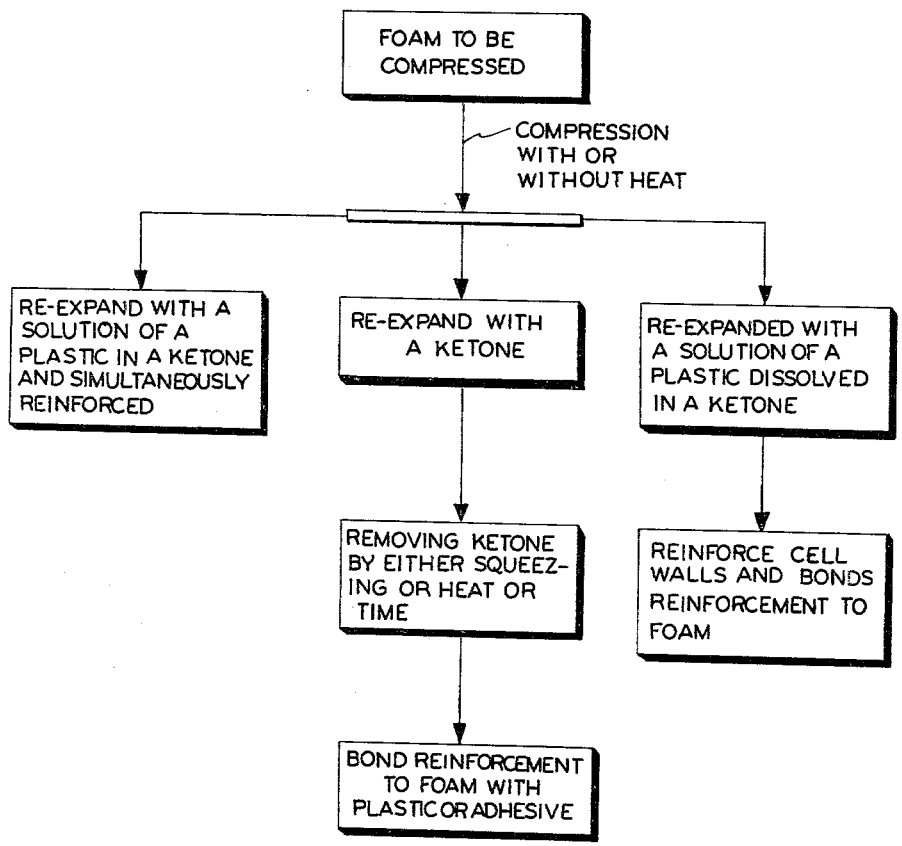
INVENTOR
SOLOMON GOLDFEIN

United States Patent Office 3,196,197
Patented July 20, 1965

3,196,197
PROCESS FOR SHIPPING RIGID POLY-
URETHANE FOAM
Solomon Goldfein, Falls Church, Va., assignor to the
United States of America as represented by the Secretary of the Army
Filed Nov. 1, 1962, Ser. No. 234,895
10 Claims. (Cl. 264—321)
(Granted under Title 35, U.S. Code (1952), sec. 266)

The invention described herein may be manufactured and used by or for the Government for governmental purposes without the payment to me of any royalty thereon.

This invention deals with the shipment of rigid polyurethane foam from one place to another where the shipping space is limited. Because of the low density of rigid polyurethane foam a large volume of this foam would weigh very little and much of a vehicle's weight carrying capacity would be wasted. The problem in transporting this foam is not in the weight but in the volume involved. Great savings could be made if the density of rigid polyurethane foam could be increased during shipment and again decreased to its original value after the foam arrived at its destination.

Unlike flexible polyurethane foam, rigid polyurethane foam undergoes a cell breakdown when it is compressed and under normal conditions will not return to its original volume when mechanical pressure is released. In this invention rigid polyurethane foam is compressed to reduce its volume during shipment and then re-expanded to its original volume.

One of the objects of this invention is to provide a method for compressing rigid polyurethane foam for shipment and then re-expanding it when it reaches its destination.

Another object of this invention is to provide a method for laminating a fibrous material layer on the surface of the re-expanded rigid polyurethane foam.

The invention comprises compressing the rigid polyurethane foam to a fraction of its original volume by mechanical pressure either at room temperature, after heating it to about 160° F. (a temperature that will enable it to become elastomeric), or compressing the foam while it is still hot from the exotherm given off by the heat of reaction while the foam is being formed. After the foam is compressed either at room temperature or at elevated temperatures, it is then ready for shipment in this compressed condition which it will retain until re-expanded. Upon arrival at its destination the compressed foam is re-expanded by immersing in a ketone such as methyl ethyl ketone or acetone. The ketone allows the rigid polyurethane foam to re-expand but the cells are in a weakened condition and it may be necessary to use a plastic dissolved in a ketone applied to the foam to strengthen these weakened cells and form a sturdy re-expanded rigid polyurethane foam again. The re-expanded foam may then be immersed in a polyester or epoxy resin properly catalyzed which when hardened will reinforce the cell walls and return the foam to its original strength. The process of re-expansion and reinforcement can be performed simultaneously by immersing the foam in a solution of a plastic in a ketone. The ketone will serve to re-expand the foam and, after the ketone has evaporated or been squeezed out, the plastic remaining will reinforce the cell walls. Solutions of the type described can consist of such plastics as polyvinyl chloride-acetate copolymer, polystyrene, acrylonitrile-butadiene-styrene copolymers and polymethyl methacrylate dissolved in a ketone.

To further strengthen this re-expanded foam a fiber reinforcement of natural or synthetic fibers or a combination thereof, can be incorporated on the surface of this rigid foam by placing said reinforcement on the re-expanded foam while the solvent is evaporating. When the solvent evaporates the reinforcement will become impregnated with the resin and caused to bond to the re-expanded rigid foam. To hasten the evaporation the re-expanded foam can be compressed slightly to squeeze out the excess absorbed solution of solvent and plastic.

I claim:
1. A method for compressing and re-expanding rigid polyurethane foam comprising the steps of:
   (a) Compressing the rigid polyurethane foam to a fraction of its original volume with compressing means;
   (b) Removing said compressed foam from said compressing means;
   (c) Re-expanding by immersing said compressed foam in a ketone;
   (d) Immersing said re-expanded foam in a plastic soluble in said ketone; and
   (e) Evaporating said ketone to produce a rigid re-expended polyurethane foam.

2. A method for compressing and re-expanding rigid polyurethane foam as claimed in claim 1 wherein the plastic is polyvinyl chloride-acetate copolymer and the ketone is a ketone selected from the group consisting of acetone and methyl ethyl ketone.

3. A method for compressing and re-expanding rigid polyurethane foam as claimed in claim 1 wherein the plastic is polystyrene and the ketone is a ketone selected from the group consisting of, acetone, and methyl ethyl ketone.

4. A method for compressing and re-expanding rigid polyurethane foam comprising the steps of:
   (a) Heating rigid polyurethane foam to 160° F.;
   (b) Compressing the heated foam to a fraction of its original volume;
   (c) Re-expanding by immersing said compressed foam in a plastic dissolved in a ketone; and
   (d) Evaporating said ketone to produce a rigid re-expanded polyurethane foam.

5. A method for compressing and re-expanding rigid polyurethane foam comprising the steps of:
   (a) Compressing the rigid polyurethane foam with compressing means to a fraction of its original volume while said foam still retains its exotherm heat of reaction;
   (b) Removing said compressed foam from the compressing means;
   (c) Re-expanding said compressed foam in a plastic dissolved in a ketone; and
   (d) Evaporating said ketone to produce a rigid re-expanded polyurethane foam.

6. A method for compressing and re-expanding rigid polyurethane foam comprising the steps of:
   (a) Compressing the rigid polyurethane foam to a fraction of its original volume;
   (b) Removing said compressed foam from the compressing means;
   (c) Re-expanding by immersing said compressed foam in a plastic dissolved in a ketone;
   (d) Placing a fiber reinforcement on the surface of said polyurethane foam; and
   (e) Evaporating said ketone to produce a reinforced, rigid, re-expanded polyurethane foam.

7. A method for compressing and re-expanding rigid polyurethane foam as claimed in claim 1 wherein the plastic is acrylonitrile-butadiene-styrene and the ketone is a ketone selected from the group consisting of acetone and methyl ethyl ketone.

8. A method for compressing and re-expanding rigid polyurethane foam as claimed in claim 1 wherein the plastic is polymethyl methacrylate and the re-expanding liquid is a ketone.

9. A method for compressing and re-expanding rigid polyurethane foam as claimed in claim 1 wherein the plastic is polyester resin.

10. A method for compressing and re-expanding rigid polyurethane foam as claimed in claim 1 wherein the plastic is an epoxy resin.

References Cited by the Examiner

UNITED STATES PATENTS

| | | | |
|---|---|---|---|
| 2,659,935 | 11/53 | Hammon | 264—321 |
| 3,000,464 | 9/61 | Watters | 264—41 XR |
| 3,082,483 | 3/63 | Bickford | 264—321 |
| 3,101,242 | 8/63 | Jackson | 264—321 XR |

ALEXANDER H. BRODMERKEL, *Primary Examiner.*